United States Patent
Manne et al.

(10) Patent No.: US 9,223,383 B2
(45) Date of Patent: Dec. 29, 2015

(54) GUARDBAND REDUCTION FOR MULTI-CORE DATA PROCESSOR

(71) Applicant: Advanced Micro Devices, Inc., Sunnyvale, CA (US)

(72) Inventors: Srilatha Manne, Portland, OR (US); Rajagopalan Desikan, Austin, TX (US); Sanjay Pant, Fort Collins, CO (US); Youngtaek Kim, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 336 days.

(21) Appl. No.: 13/724,271

(22) Filed: Dec. 21, 2012

(65) Prior Publication Data

US 2014/0181537 A1    Jun. 26, 2014

(51) Int. Cl.
*G06F 1/32* (2006.01)

(52) U.S. Cl.
CPC .............. *G06F 1/324* (2013.01); *G06F 1/3243* (2013.01); *G06F 1/3296* (2013.01); *Y02B 60/1217* (2013.01); *Y02B 60/1239* (2013.01); *Y02B 60/1285* (2013.01); *Y02B 60/32* (2013.01)

(58) Field of Classification Search
CPC ..... G06F 1/324; G06F 1/3243; G06F 1/3296; Y02B 60/1217; Y02B 60/1239; Y02B 60/1285; Y02B 60/32
See application file for complete search history.

(56) References Cited

U.S. PATENT DOCUMENTS

| | | | |
|---|---|---|---|
| 4,317,181 A | 2/1982 | Teza et al. | |
| 4,698,748 A | 10/1987 | Juzswik et al. | |
| 4,747,041 A | 5/1988 | Engel et al. | |
| 4,758,945 A | 7/1988 | Remedi | |
| 4,952,817 A | 8/1990 | Bolan et al. | |
| 4,980,836 A | 12/1990 | Carter et al. | |
| 5,086,501 A | 2/1992 | DeLuca et al. | |
| 5,142,684 A | 8/1992 | Perry et al. | |
| 5,167,024 A | 11/1992 | Smith et al. | |
| 5,300,831 A | 4/1994 | Pham et al. | |
| 5,307,003 A | 4/1994 | Fairbanks et al. | |

(Continued)

FOREIGN PATENT DOCUMENTS

| | | |
|---|---|---|
| EP | 0632360 A1 | 1/1995 |
| WO | 03014902 | 2/2003 |

OTHER PUBLICATIONS

T. Miller, R. Thomas, X. Pan and R. Teodorescu, "VRSync: Characterizing and Eliminating Synchronization-Induced Voltage Emergencies in Many-core Processors", Jun. 2012, p. 249 to p. 260, 39th Annual International Symposium on Computer Architecture (ISCA).

(Continued)

*Primary Examiner* — M Elamin
(74) *Attorney, Agent, or Firm* — Polansky & Associates, P.L.L.C.; Paul J. Polansky

(57) ABSTRACT

A multi-core data processor includes multiple data processor cores and a power controller. Each data processor core has a first input for receiving a clock signal, a second input for receiving a power supply voltage, and an output for providing an idle signal. The power controller is coupled to each of the data processor cores for providing the clock signal and the power supply voltage to each of the data processor cores. The power controller provides at least one of the clock signal and the power supply voltage to an active one of the data processor cores in dependence on a number of idle signals received from the data processor cores.

26 Claims, 5 Drawing Sheets

(56) References Cited

U.S. PATENT DOCUMENTS

| | | |
|---|---|---|
| 5,396,635 A | 3/1995 | Fung |
| 5,423,045 A | 6/1995 | Kannan et al. |
| 5,428,790 A | 6/1995 | Harper |
| 5,485,127 A | 1/1996 | Bertoluzzi et al. |
| 5,504,909 A | 4/1996 | Webster et al. |
| 5,752,011 A | 5/1998 | Thomas et al. |
| 5,758,175 A | 5/1998 | Fung |
| 5,778,237 A | 7/1998 | Yamamoto et al. |
| 5,781,783 A | 7/1998 | Gunther et al. |
| 5,787,294 A | 7/1998 | Evoy |
| 5,798,918 A | 8/1998 | Georgiou et al. |
| 5,812,860 A | 9/1998 | Horden |
| 5,832,284 A | 11/1998 | Michail et al. |
| 5,838,578 A | 11/1998 | Pippin |
| 5,860,125 A | 1/1999 | Reents |
| 5,892,959 A | 4/1999 | Fung |
| 5,898,232 A | 4/1999 | Reents |
| 5,940,785 A | 8/1999 | Georgiou |
| 5,991,883 A | 11/1999 | Atkinson |
| 6,047,248 A | 4/2000 | Georgiou |
| 6,079,025 A | 6/2000 | Fung |
| 6,119,241 A | 9/2000 | Michail |
| 6,141,762 A | 10/2000 | Nicol et al. |
| 6,311,287 B1 | 10/2001 | Dischler et al. |
| 6,691,236 B1 | 2/2004 | Atkinson |
| 6,711,447 B1 | 3/2004 | Saeed |
| 6,785,826 B1 | 8/2004 | Durham et al. |
| 6,789,037 B2 | 9/2004 | Gunther |
| 6,789,207 B1 | 9/2004 | Maejima |
| 6,792,582 B1 | 9/2004 | Cohn et al. |
| 6,804,632 B2 | 10/2004 | Orenstien et al. |
| 6,845,456 B1 | 1/2005 | Menezes et al. |
| 6,859,882 B2 | 2/2005 | Fung |
| 6,889,332 B2 | 5/2005 | Helms et al. |
| 6,895,520 B1 | 5/2005 | Altmejd |
| 6,908,227 B2 | 6/2005 | Rusu |
| 6,922,783 B2 | 7/2005 | Knee |
| 6,931,559 B2 | 8/2005 | Burns et al. |
| 6,976,182 B1 | 12/2005 | Filippo |
| 6,978,389 B2 | 12/2005 | Jahnke |
| 6,993,669 B2 | 1/2006 | Sherburne |
| 7,028,196 B2 | 4/2006 | Soltis |
| 7,032,119 B2 | 4/2006 | Fung |
| 7,051,218 B1 | 5/2006 | Gulick |
| 7,174,467 B1 | 2/2007 | Helms |
| 7,216,064 B1 | 5/2007 | Pippin |
| 7,228,441 B2 | 6/2007 | Fung |
| 7,237,129 B2 | 6/2007 | Fung |
| 7,254,721 B1 | 8/2007 | Tobias |
| 7,272,735 B2 | 9/2007 | Fung |
| 7,281,140 B2 | 10/2007 | Burns |
| 7,376,848 B2 | 5/2008 | Beard |
| 7,484,111 B2 | 1/2009 | Fung |
| 7,496,788 B1 | 2/2009 | Alfieri et al. |
| 7,512,822 B2 | 3/2009 | Fung |
| 7,533,283 B2 | 5/2009 | Fung |
| 7,552,350 B2 | 6/2009 | Fung |
| 7,558,976 B2 | 7/2009 | Fung |
| 7,562,239 B2 | 7/2009 | Fung |
| 7,647,513 B2 | 1/2010 | Tobias |
| 7,650,518 B2 * | 1/2010 | Allarey et al. ............... 713/300 |
| 7,664,971 B2 | 2/2010 | Oh |
| 7,721,125 B2 | 5/2010 | Fung |
| 7,822,967 B2 | 10/2010 | Fung |
| 8,074,092 B2 | 12/2011 | Fung |
| 8,086,884 B2 | 12/2011 | Naffziger |
| 8,261,285 B2 | 9/2012 | Felter et al. |
| 8,417,848 B2 | 4/2013 | Yang et al. |
| 2002/0004912 A1 | 1/2002 | Fung |
| 2003/0030326 A1 | 2/2003 | Shenai |
| 2003/0122429 A1 | 7/2003 | Zhang |
| 2003/0135768 A1 | 7/2003 | Knee |
| 2003/0188208 A1 | 10/2003 | Fung |
| 2003/0196126 A1 | 10/2003 | Fung |
| 2003/0200473 A1 | 10/2003 | Fung |
| 2004/0117678 A1 | 6/2004 | Soltis |
| 2004/0117680 A1 | 6/2004 | Naffziger |
| 2005/0108582 A1 | 5/2005 | Fung |
| 2005/0177755 A1 | 8/2005 | Fung |
| 2005/0289365 A1 * | 12/2005 | Bhandarkar ............... 713/300 |
| 2006/0248324 A1 | 11/2006 | Fung |
| 2006/0248325 A1 | 11/2006 | Fung |
| 2006/0248358 A1 | 11/2006 | Fung |
| 2006/0248359 A1 | 11/2006 | Fung |
| 2006/0248360 A1 | 11/2006 | Fung |
| 2006/0248361 A1 | 11/2006 | Fung |
| 2006/0253717 A1 | 11/2006 | Fung |
| 2006/0259796 A1 | 11/2006 | Fung |
| 2006/0259797 A1 | 11/2006 | Fung |
| 2006/0265608 A1 | 11/2006 | Fung |
| 2006/0265609 A1 | 11/2006 | Fung |
| 2007/0101173 A1 | 5/2007 | Fung |
| 2008/0005592 A1 * | 1/2008 | Allarey et al. ............... 713/300 |
| 2009/0132844 A1 * | 5/2009 | Allarey et al. ............... 713/340 |
| 2011/0219382 A1 | 9/2011 | Hou |
| 2013/0007413 A1 * | 1/2013 | Thomson et al. ............... 712/30 |

OTHER PUBLICATIONS

Advanced Micro Devices, Inc., "BIOS and Kernel Developer's Guide (BKDG) for AMD Family 15h Models 00h-0Fh Processors", pp. 1-2 and pp. 60-88, Nov. 14, 2011, 42301, Rev 3.04, Advanced Micro Devices, Inc., One AMD Place, Sunnyvale, CA 94085.

R. Joseph, D. Brooks, and M. Martonosi, "Control Techniques to Eliminate Voltage Emergencies in High Performance Processors," Int'l Symposium on High-Performance Computer Architecture, 2003.

E. Grochowski, D. Ayers, and V. Tiwari, "Microarchitectural Simulation and Control of di/dt-induced Power Supply Voltage Variation," Int'l Symposium on High-Performance Computer Architecture, 2002.

M. Powell and T. N. Vijaykumar, "Exploiting Resonant Behavior to Reduce Inductive Noise," Int'l Symp. on Computer Architecture, 2004.

W. El-Essawy and D. Albonesi, "Mitigating Inductive Noise in SMT Processors," International Symposium on Low Power Electronics and Design, 2004.

M. S. Gupta, K. Rangan, M. D. Smith, G.-Y. Wei, and D. M. Brooks, "Towards a Software Approach to Mitigate Voltage Emergencies," International Symposium on Low-Power Electronics and Design, 2007.

K. Hazelwood and D. Brooks, "Eliminating Voltage Emergencies via Microarchitectural Voltage Control Feedback and Dynamic Optimization," International Symposium on Low-Power Electronics and Design, 2004.

C. Lefurgy, A. Drake, M. Floyd, M. Allen-Ware, B. Brock, J. Tierno, and John Carter, "Active Management of Timing Guardband to Save Energy in POWER7", Proceedings of the 44th Annual International Symposium on Microarchitecture, Dec. 2011.

V. J. Reddi, M. S. Gupta, G. Holloway, G. Wei, M. D. Smith, D. Brooks, "Voltage Emergency Prediction: Using Signatures to Reduce Operating Margins," HPCA, 2009.

Compaq Computer Corporation, Intel Corporation, Microsoft Corporation, Phoenix Technologies Ltd. and Toshiba Corporation, "Advanced Configuration and Power Interface Specification", 481 Pages, Revision 2.0, Jul. 27, 2000.

Anton Shilov, "AMD Unveils Bulldozer Micro-Architecture Peculiarities", 3 Pages, http://www.xbitlabs.com/news/cpu/display/20100824154814_AMD_Unveils_Details_About_Bulldozer_Microprocessors.html, Aug. 24, 2010.

Actions on Merits for Copending U.S. Appl. No. 13/724,133, filed Dec. 21, 2012.

K. Nowka et al., "A 0.9V to 1.95V Dynamic Voltage-Scalable and Frequency-Scalable 32b PowerPC Processor," 2002 IEEE International Solid-State Circuits Conference, Session 20, Microprocessors, 20.4, 0-7803-7335-9, 2 pages.

K. Nowka et al., "A 32-bit PowerPC System-on-a-Chip With Support for Dynamic Voltage Scaling and Dynamic Frequency Scaling," IEEE Journal of Solid-State Circuits, vol. 37, No. 11, Nov. 2002, pp. 1441-1447.

(56) References Cited

OTHER PUBLICATIONS

K. Suzuki et al., "A 300MIPS/W RISC Core Processor with Variable Supply-Voltage Scheme in Variable Threshold Voltage CMOS," IEEE 1997 Custom Integrated Circuits Conference, 0-7803-3669-0, pp. 587-590.
T. Burd et al., "A Dynamic Voltage Scaled Microprocessor System," IEEE Journal of Solid-State Circuits, vol. 35, No. 11, Nov. 2000, pp. 1571-1580.
S. Sakiyama et al., "A lean power management technique: The lowest power consumption for the given operating speed of LSIs," 1997 Symposium on VLSI Circuits Digest of Technical Papers, 4-930813-76-X, pp. 99-100.
S. Gutta et al., "A Low-Power Integrated x86-64 and Graphics Processor for Mobile Computing Devices," 2011 IEEE International Solid-State Circuits Conference, Session 15, High-Performance SoCs & Components, 15.4, Feb. 22, 2011, pp. 270-272.
L. Benini et al., "A Survey of Design Techniques for System-Level Dynamic Power Management," IEEE Transactions on Very Large Scale Integration (VLSI) Systems, vol. 8, No. 3, Jun. 2000, pp. 299-316.
P. Macken et al., "A Voltage Reduction Technique for Digital Systems," 1990 IEEE International Solid-State Circuits Conference, Session 15, Innovative Circuit Design, FPM 15.2, 0193-6530/90-0000-0238, Feb. 16, 1990, pp. 238-239.
Compaq Computer Corporation, Intel Corporation, Microsoft Corporation, Phoenix Technologies Ltd. & Toshiba Corporation, "Advanced Configuration and Power Interface Specification," Revision 2.0a, Mar. 31, 2002, 500 pages.
D. Marculescu et al., "Application-Driven Processor Design Exploration for Power-Performance Trade-off Analysis," 2001 IEEE, 0-7803-7247-6/01, pp. 306-313.
M. Pedram, "CAD for Low Power: Status and Promising Directions," 1995 IEEE International Symposium on VLSI Technology, Systems, and Applications, 0-7803-2773-X, pp. 331-336.
G. Semeraro et al., "Dynamic Frequency and Voltage Control for a Multiple Clock Domain Microarchitecture," Proceedings of the 35th Annual IEEE/ACM International Symposium on Microarchitecture (MICRO-35), 1072-4451/02, 2002, 12 pages.
S. Akui et al., "Dynamic Voltage and Frequency Management for a Low-Power Embedded Microprocessor," 2004 IEEE International Solid-State Circuits Conference, Session 3, Processors, 3.5, Feb. 16, 2004, 10 pages.
G. Semeraro et al., "Energy-Efficient Processor Design Using Multiple Clock Domains with Dynamic Voltage and Frequency Scaling," Proceedings of the Eighth International Symposium on High-Performance Computer Architecture (HPCA'02), 1503-0897/02, 2002, 12 pages.
Intel Corporation, "Intel Pentium 4 Processor in the 423-pin Package at 1.30, 1.40, 1.50, 1.60, 1.70, 1.80, 1.90 and 2 GHz," Datasheet, 249198-005, Aug. 2001, 90 pages.
Intel Corporation, "Intel Pentium 4 Processor in the 478-Pin Package at 1.40 GHz, 1.50 GHz, 1.60 GHz, 1.70 GHz, 1.80 GHz, 1.90 GHz, and 2 GHz," Datasheet, 249887-003, Apr. 2002, 100 pages.
D. Lackey et al., "Managing Power and Performance for System-on-Chip Designs using Voltage Islands," IEEE, 0-7803-7607-2/02, 2002, pp. 195-202.
A. Iyer et al., "Microarchitecture-Level Power Management," IEEE Transactions on Very Large Scale Integration Systems (VLSI) Systems, vol. 10, No. 3, Jun. 2002, 1063-8210/02, pp. 230-239.
A. Iyer et al., "Power and Performance Evaluation of Globally Asynchronous Locally Synchronous Processors," Proceedings of the 29th Annual International Symposium on Computer Architecture (ISCA'02), 1063-6897/02, 2002, 11 pages.
A. Iyer et al., "Power Aware Microarchitecture Resource Scaling," IEEE, 1530-1591/01, 2001, pp. 190-196.
A. Iyer et al., "Power Efficiency of Voltage Scaling in Multiple Clock, Multiple Voltage Cores," IEEE, 0-7803,7607-2/02, 2002, pp. 379-386.
K. Niyogi et al., "Speed and Voltage Selection for GALS Systems Based on Voltage/Frequency Islands," IEEE, 0-7803-8736-8/05, 2005, pp. 292-297.
T. Pering et al., "The Simulation and Evaluation of Dynamic Voltage Scaling Algorithms," ACM, 1-58113-059-7/9810008, 1998, pp. 76-81.
H. Sanchez et al., "Thermal Management System for High Performance PowerPC Microprocessors," IEEE, 1063-6390/97, 1997, pp. 325-330.
E. Talpes et al., "Toward a Multiple Clock/Voltage Island Design Style for Power-Aware Processors," IEEE Transactions on Very Large Scale Integration (VSLI) Systems, vol. 13, No. 5, May 2005, 1063-8210, pp. 591-603.
T. Pering et al., "Voltage Scheduling in the lpARM Microprocessor System," ACM, 1-58113-190-9/00/0007, 2000, pp. 96-101.

* cited by examiner

300

400

GUARDBAND REDUCTION FOR MULTI-CORE DATA PROCESSOR

Related subject matter is found in a copending patent application entitled "Power Control for Multi-Core Data Processor", U.S. patent application Ser. No. 13/724,133, filed Dec. 21, 2012, by Srilatha Manne et al. and assigned to the assignee hereof.

FIELD

This disclosure relates generally to data processors, and more specifically to data processors with power control.

BACKGROUND

In complementary metal oxide semiconductor (CMOS) integrated circuits, dynamic power consumption is equal to the capacitance of the integrated circuit times the frequency of operation times the square of the voltage, or $P=CV^2f$. In order to reduce power consumption, modern microprocessors have adopted dynamic power management using "P-states". A P-state is a voltage and frequency combination. An operating system (OS) determines the frequency required to complete the current tasks, such as real-time execution of an application program, and causes an on-chip power state controller to set the clock frequency accordingly. For example, if on average the microprocessor is heavily utilized, then the OS determines that the frequency should be increased. On the other hand if on average the microprocessor is lightly utilized, then the OS determines that the frequency should be decreased. The available frequencies and corresponding voltages necessary for proper operation at those frequencies are stored in a P-state table. As the operating frequency increases, the required power supply voltage also increases, but because power is related to the square of the voltage, it is important to keep the voltage low while still ensuring proper operation.

When populating the P-state table, integrated circuit designers not only determine the voltage that will ensure proper operation at a given frequency, but also provide sufficient margin so that the microprocessor operates correctly even under so-called "worst case" conditions. This margin is known as the "guardband". However setting the guardband for "worst case" conditions means that most of the time the voltage is higher than necessary and thus the microprocessor consumes additional power.

Figure 1:
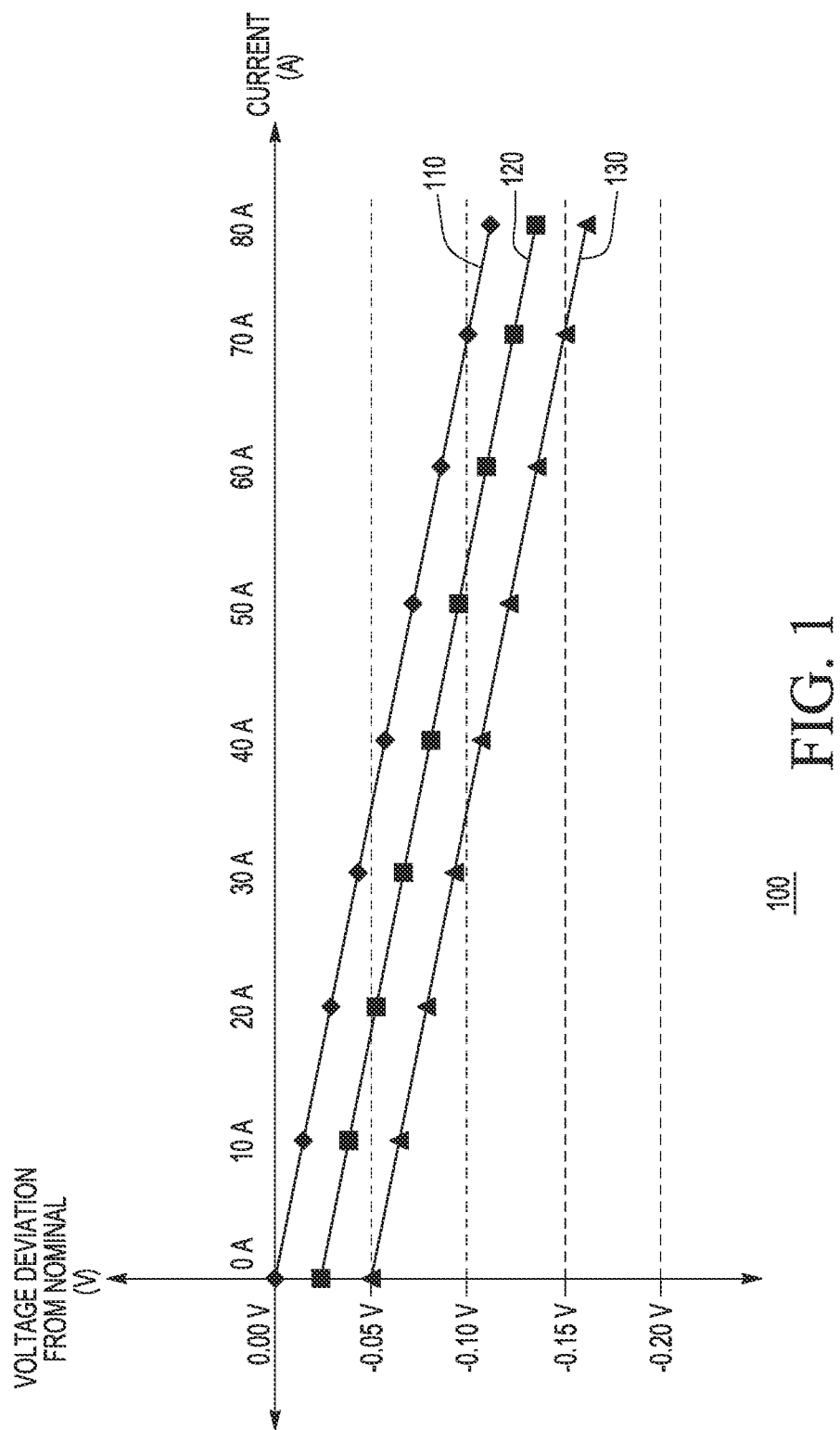
FIG. 1 illustrates a graph helpful in understanding the use of voltage guardbands in a data processor according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A multi-core data processor can have anywhere from two to thirty-two or more data processor cores and is specified to operate within a power supply voltage range. The multi-core data processor is designed to operate within this range even if intense activity of the other data processor cores results in power supply droop. A multi-core data processor as disclosed below includes multiple data processor cores and a power controller. The power controller provides at least one of a clock signal and a power supply voltage to an active one of the data processor cores in dependence on a number of idle signals received from the data processor cores. In some embodiments, the power controller provides a power supply voltage to the active one of the data processor cores by adding a variable voltage guardband determined by the number of idle signals received from the data processor cores. In some embodiments, the power controller provides the clock signal to the active one of the data processor cores with a frequency guardband determined by the number of idle signals received from the data processor cores. Thus, the multi-core data processor either saves power by providing a lower power supply voltage at a given frequency to an active data processor core when other cores are idle, improves performance by increasing the clock frequency to the active data processor core for a given power supply voltage when other cores are idle, or both.

FIG. 1 illustrates a graph 100 helpful in understanding the use of voltage guardbands in a data processor according to the prior art. The horizontal axis represents output current of the data processor in amperes (A), from 0 A to 80 A, and the vertical axis represents deviation from a nominal value of a power supply voltage of the data processor in volts (V), from 0.00 V to −0.20 V. A load line 110 represents a maximum voltage ("Vmax") load line, a load line 120 represents a typical voltage ("Vtyp") load line, and a load line 130 represents a minimum voltage ("Vmin") load line.

In operation, the data processor provides a voltage identification field (VID) to a voltage regulator and in response, the voltage regulator provides the indicated power supply voltage to the data processor. As the data processor increases its activity level, the nominal power supply voltage decreases based on the voltage drop caused by the impedance of the power distribution network. The data processor can accommodate this additional voltage drop by increasing the power supply voltage (VID) so that the power supply voltage seen by the internal circuits remains about the same and remains sufficient for proper operation at the selected frequency.

FIG. 1 illustrates the needed voltage guardband as the difference between the nominal voltage at the desired frequency, and the Vmin load line. For example at a current of 30 A, the designer needs to provide a voltage guardband of about 10 millivolts (mV), whereas at a current of 80 A, the designer needs to provide a voltage guardband of about 160 mV. A guardband of 160 mV would be sufficient if the current will be less than 80 A. If the designer accounted for the load line by increasing the power supply voltage based on the amount of current, the internal power supply voltage would vary from the nominal voltage by plus and minus about 25 millivolts (mV) between the Vmax and Vmin load lines.

However a fixed guardband may not be sufficient in a multi-core data processor in which different cores run different threads and can possibly synchronize on activity. A data processor that adjusts guardbands according to the number of idle cores will now be described.

Figure 2:
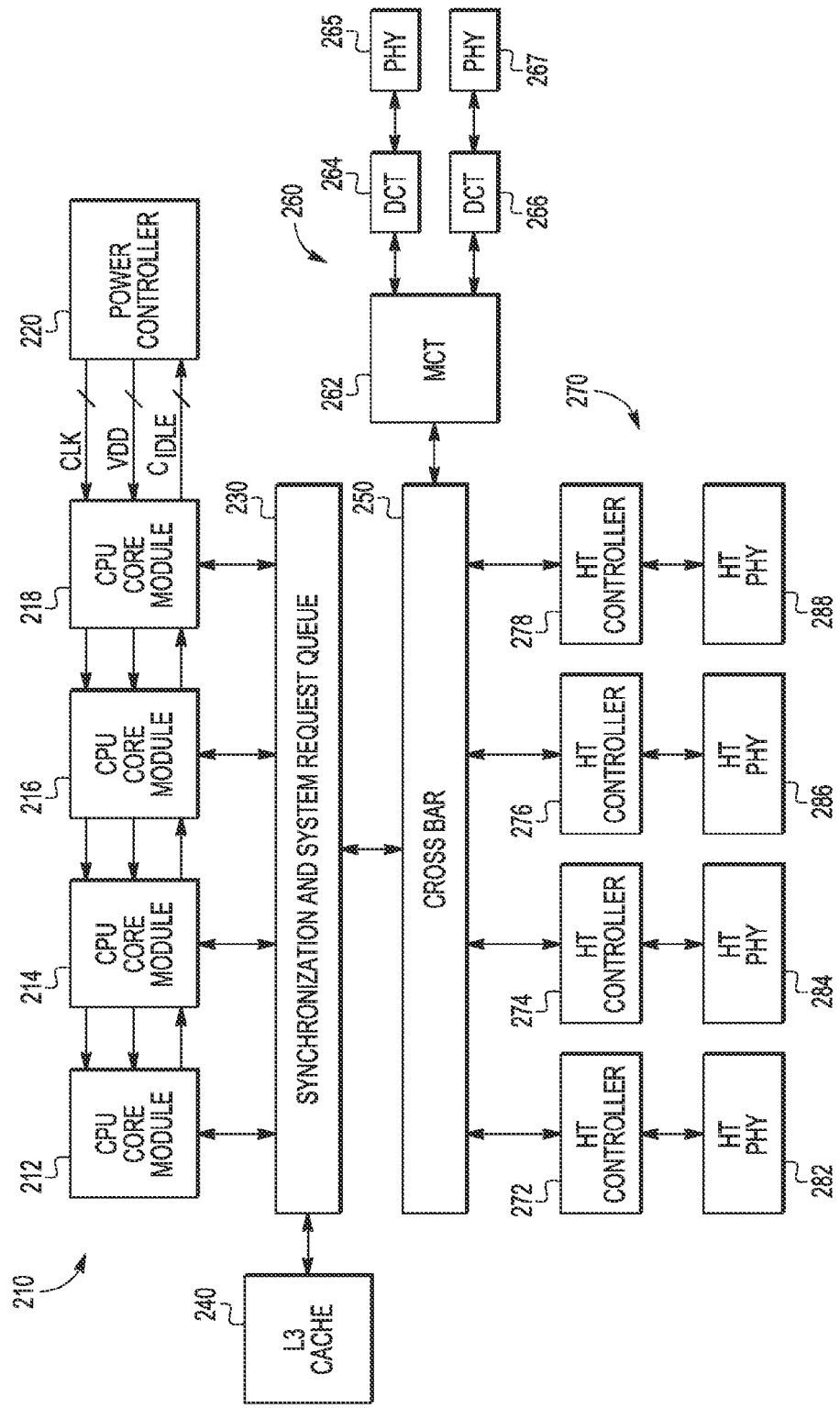
FIG. 2 illustrates in block diagram form a multi-core data processor according to some embodiments.

FIG. 2 illustrates in block diagram form a multi-core data processor 200 according to some embodiments. Multi-core data processor 200 generally includes multiple data processor cores in the form of a set of CPU core modules 210, a power controller 220, a synchronization and system request queue 230, a third level (L3) cache 240, a crossbar 250, a memory interface 260, and a set of four HyperTransport (HT) link controllers 270.

Set of CPU core modules 210 includes a CPU core module 212, a CPU core module 214, a CPU core module 216, and a CPU core module 218. Each CPU core module 210 has an input to receive a clock signal labeled "CLK", an input to receive a power supply voltage labeled "$V_{DD}$", and an output to provide a corresponding idle signal labeled "$C_{IDLE}$". Power controller 220 has a set of outputs to provide respective CLK signals to CPU core modules 210, a set of outputs to provide respective power supply voltages $V_{DD}$ to CPU core modules 210, and a set of inputs to receive respective $C_{IDLE}$ signal from each of CPU core modules 210.

Synchronization and system request queue 230 is connected to each of CPU core modules 210. L3 cache 240 is connected to synchronization and system request queue 230. Crossbar 250 is connected to synchronization and system request queue 230.

Memory interface 260 provides two dynamic random access memory (DRAM) channels, and includes a memory controller ("MCT") 262, a DRAM controller ("DCT") 264 and a physical layer (PHY) 265 for a first memory channel, and a DCT 266 and a PHY 267 for a second memory channel. MCT 262 is connected to crossbar 250. DCT 264 is connected to MCT 262. PHY 265 is connected to DCT 264. DCT 266 is connected to MCT 262. PHY 267 is connected to DCT 266.

HT link controllers 270 include an HT controller 272, an HT controller 274, an HT controller 276, an HT controller 278, an HT PHY 282, an HT PHY 284, an HT PHY 286, and an HT PHY 288. Each HT controller 272, 274, 276, and 278, respectively, is connected to crossbar 250. Each HT PHY 282, 284, 286, and 288 is connected to a corresponding HT controller 272-278.

In operation, an operating system (OS) or Kernel typically includes a scheduler to determine which resources of CPU core modules 210 to assign to a computer process. In particular, a process has multiple threads that multi-core data processor 200 generally executes while managing overall performance and power consumption. In response to the intensity of a task, the scheduler determines whether to compact threads to run on a small number of CPU core modules 210, or to scatter threads across a larger number of selected CPU core modules 210.

Synchronization and system request queue 230, L3 cache 240, crossbar 250, and memory interface 260 typically form a controller known as a Northbridge (NB). Synchronization and system request queue 230 synchronizes and stores accesses for dispatch to memory interface 260 or HT controllers 274-278. Synchronization and system request queue 230 and crossbar 250 form a traffic hub to route, for example, requests from CPU core modules 210 to L3 cache 240, or a request from an HT agent (not shown) to HT controllers 272-278.

Each of CPU core modules 210 share L3 cache 240, which provides the memory for a third level of cache within a cache hierarchy. MCT 262 accesses memory locations in the address space of memory, in response to memory access requests, and in particular, MCT 262 sends DRAM read and write requests to DCTs 264 and 266. PHYs 265 and 267 each provide an interface for DCTs 264 and 266, respectively, to corresponding DRAM memory locations (not shown), as indicated according to DRAM compatible standards. HT link controllers 270 control connections between crossbar 250 and external HT agents, using HT controllers 272-278 and PHYs 282-288, as indicated according to HT compatible standards.

Each of CPU core modules 210 has the capability to fetch and execute instructions corresponding to one or more threads and to access data associated with the threads by providing memory access requests to synchronization and system request queue 230. In some embodiments to provide a greater degree of flexibility, power controller 220 provides a separate power supply voltage and a separate CLK signal to each of CPU core modules 210. When in an active mode, each different combination of power supply voltage and CLK frequency defines a "P-state". In some embodiments to provide lower cost, power controller 220 provides separate CLK signals to each of CPU core modules 210 but a common power supply voltage. In these embodiments, the power supply voltage is set to a level required by the highest P-state CPU core. These embodiments are lower cost because they can use only a single voltage regulator and if the voltage regulator is external to the chip, only one set of external VID pins.

Power controller 220 has the capability to throttle each of power supply voltage and CLK signal frequency for corresponding CPU core modules 210. Also, based on available headroom and workload of an application, power controller 220 has the capability to throttle up or down the P-state for corresponding active CPU core modules 210.

Power controller 220 provides a power supply voltage and/or a clock signal to an active CPU core module depending on a number of $C_{IDLE}$ signals received from CPU core modules 210. In some embodiments, power controller 220 selectively provides power supply voltage $V_{DD}$ to the active CPU core modules with a voltage guardband determined by a number of $C_{IDLE}$ signals received from CPU core modules 210. In some embodiments, power controller 220 provides a common power supply voltage or respective power supply voltages to active CPU core modules 210 with a voltage guardband related to a number of active cores and inversely related to a number of signals $C_{IDLE}$ received from CPU core modules 210.

Also, in some embodiments, power controller 220 selectively provides the CLK signal to active CPU core modules 210 with a frequency guardband determined by a number of signals $C_{IDLE}$ received from CPU core modules 210. In some embodiments, power controller 220 selectively provides the CLK signal to active CPU core modules 210 with a frequency guardband related to a number of active cores and inversely related to a number of signals $C_{IDLE}$ received from CPU core modules 210.

By providing at least one of the CLK signal and the power supply voltage to an active one of CPU core modules 210 in dependence on a number of idle signals received from CPU core modules 210, multi-core data processor 200 saves power by selectively providing a lower power supply voltage at a given frequency to an active CPU core module, and/or improves performance by increasing the CLK frequency to an active CPU core module for a certain power supply voltage, or both.

Figure 3:
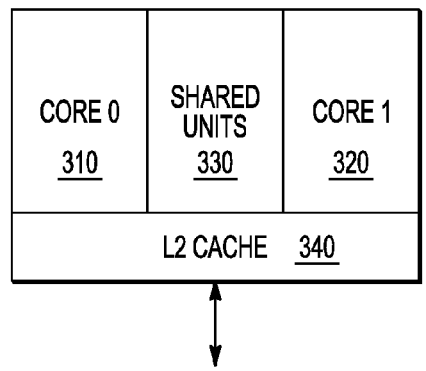
FIG. 3 illustrates in block diagram form a CPU core module that may be used to implement the CPU core modules of FIG. 2 according to some embodiments.

FIG. 3 illustrates in block diagram form a CPU core module 300 that may be used to implement the CPU core modules 210 of FIG. 2 according to some embodiments. CPU core module 300 generally includes a data processor core 310 labeled "CORE$_0$", a data processor core 320 labeled "CORE$_1$", multiple shared resources 330 labeled "SHARED UNITS", and a second level (L2) cache 340. L2 cache 340 is connected to synchronization and system request queue 230 (not shown).

In operation, data processor cores 310 and 320 each execute threads utilizing dedicated, unshared resources (not shown). Examples of these resources include the integer pipelines and an L1 data cache. Data processor cores 310 and 320 also execute threads utilizing shared resources 330. Examples of these resources include the fetch units, the decode units, the integer schedulers, the floating point schedulers, some execution pipelines, and an L1 instruction cache.

For example, data processor cores 310 and 320 share L2 cache 340. If data processor cores 310 and 320 perform a read or write access, the corresponding CPU core checks its dedicated L1 cache first to see whether the L1 cache has allocated a cache line corresponding to the access address. If the cache line is present in the L1 cache (i.e. the access "hits" in the L1 cache), CPU core 310 completes the access with the L1 cache. If the access misses in the L1 cache, the L1 cache checks L2 cache 340, since L2 cache 340 is the second level of the memory hierarchy.

A multi-core data processor using CPU core module 300 as shown in FIG. 3 can provide a common clock signal and a common power supply voltage to both cores to simplify the power control circuitry. Moreover, the multi-threaded operating system can assign application program code to data processor cores 310 and 320 from a single thread. Note that in some embodiments, CPU core module 300 can be implemented with a single core.

Figure 4:
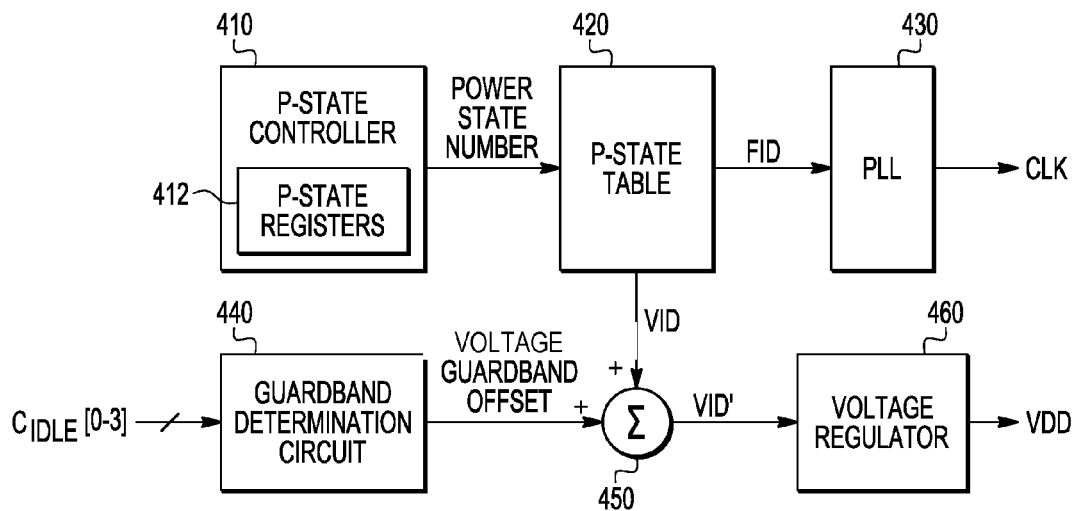
FIG. 4 illustrates in block diagram form a power controller that may be used to implement a portion of the power controller of FIG. 2 according to some embodiments.

FIG. 4 illustrates in block diagram form a power controller 400 that may be used to implement a portion of power controller 220 of FIG. 2 according to some embodiments. Power controller 400 generally includes a power state (P-State) controller 410, a power state table 420, a phase locked loop (PLL) 430, a guardband determination circuit 440, an adder ("Σ") 450, and a voltage regulator 460. Power state controller 410 includes multiple P-state registers 412.

Power state controller 410 has an output to provide a signal labeled "POWER STATE NUMBER". Power state table 420 has an input to receive the POWER STATE NUMBER, an output to provide a voltage identification signal labeled "VID", and an output to provide a frequency identification signal labeled "FID". Phase locked loop 430 has an input to receive signal FID and an output to provide signal CLK.

Guardband determination circuit 440 has an input to receive signals C$_{IDLE}$ [0-3] from each corresponding CPU core module 210 and an output to provide a signal labeled "VOLTAGE GUARDBAND OFFSET". Adder 450 has a first input ("+") to receive signal VOLTAGE GUARDBAND OFFSET, a second input ("+") to receive signal VID, and an output to provide a modified voltage identification signal labeled "VID'". Voltage regulator 460 has an input to receive signal VID' and an output to provide power supply voltage VDD.

In operation, power controller 400 manages CPU core modules 210 through multiple P-states, where each P-state indicates an idle state or an active state based on a voltage/frequency operational point. Power state controller 410 has the capability to coordinate with an OS, or to make independent hardware decisions, to direct both performance and power management algorithms.

P-state registers 412 have fields to control P-state voltage/frequency operational points, based on, for example, thread execution status of CPU core modules 210, performance objectives, and power management objectives. In response, power state controller 410 provides the POWER STATE NUMBER to power state table 420, and in response, power state table 420 provides corresponding fields of VID and FID signals. For each operational point, power state table 420 provides the FID signal to phase locked loop 430, and in response, phase locked loop 430 provides the CLK signal at a corresponding frequency to selected ones of CPU core modules 210.

Also, guardband determination circuit 440 provides the VOLTAGE GUARDBAND OFFSET to adder 450 in response to a number of idle CPU core modules 210 indicated by signals C$_{IDLE}$ [0-3]. Adder 450 adds the value indicated by field VOLTAGE GUARDBAND OFFSET to field VID to form a modified signal VID', and provides the VID' signal at a level related to a number of active cores and inversely related to the number of signals C$_{IDLE}$ received from CPU core modules 210.

For example, if CPU core modules 212, 214, and 216 are idle (not actively running threads), power controller 400 detects a relatively low "worst case" power supply voltage droop. Guardband determination circuit 440 provides a relatively small (and possibly zero) VOLTAGE GUARDBAND OFFSET, which adder 450 adds to the unmodified VID to provide VID'. In response, voltage regulator 460 provides a power supply voltage V$_{DD}$ to an active CPU core module such as CPU core module 218 with a relatively small guardband (lower V$_{DD}$). Alternatively, for example, if CPU core modules 212, 214, 216, and 218 are all active, power controller 400 detects a relatively high "worst case" power supply voltage droop. Guardband determination circuit 440 provides a relatively large VOLTAGE GUARDBAND OFFSET, which adder 450 adds to the unmodified VID to provide VID'. In response, voltage regulator 460 provides power supply voltage V$_{DD}$ to the active CPU core modules with a larger guardband (higher V$_{DD}$). If more than one but fewer than all of the active CPU core modules are idle, then guardband determination circuit 440 provides a VOLTAGE GUARDBAND OFFSET of intermediate size.

In embodiments in which each CPU core module is operating with a separate V$_{DD}$, power controller 400 will be replicated for each CPU core module. In embodiments in which all cores share a common V$_{DD}$, the power controller will include a circuit that determines the VDD needed for the highest P-state CPU core module, and input the VID to a common voltage regulator.

By providing power supply voltage V$_{DD}$ to an active one of CPU core modules 210 with a voltage guardband determined by the number of idle signals received from CPU core modules 210, multi-core data processor 200 reduces the possibility of failure due to voltage droop when the CPU core modules may synchronize, and saves power when fewer CPU core modules can synchronize.

Figure 5:
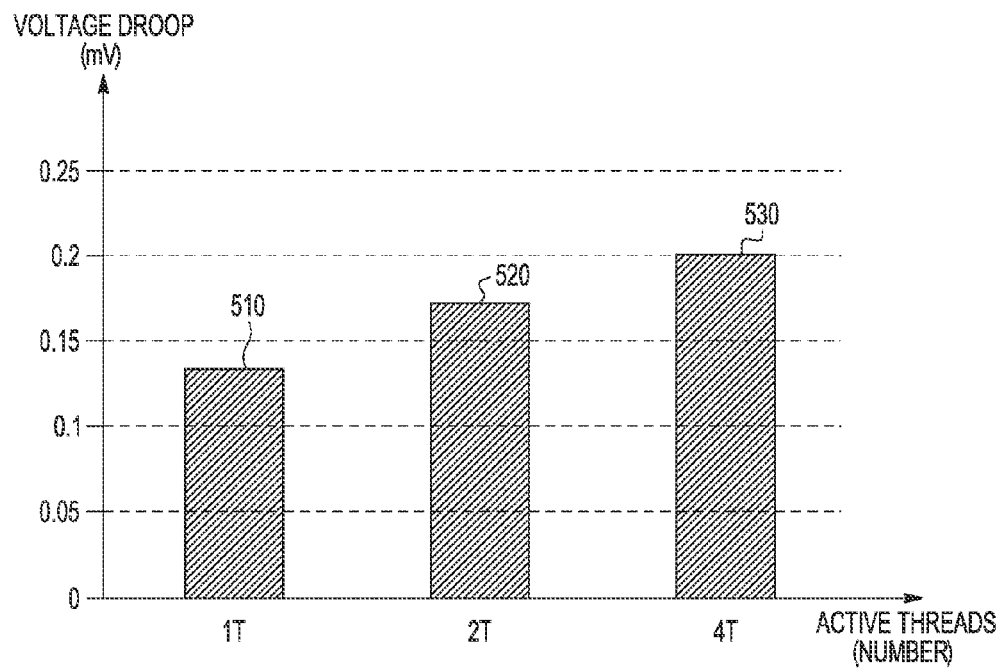
FIG. 5 illustrates a graph useful in understanding power supply voltage droop of a multi-core data processor according to some embodiments.

FIG. 5 illustrates a graph 500 useful in understanding power supply voltage droop of a multi-core data processor according to some embodiments. The horizontal axis represents a number of active threads running on multi-core data processor 200, from 1 thread ("1T") to 4 threads ("4T"), and the vertical axis represents a "worst-case" voltage droop on the power supply voltage of multi-core data processor 200 in millivolts (mV), from 0 mV to 0.25 mV. The "worst case"

voltage droop represents the highest voltage droop observed when running a stress test. A 1T rectangular bar 510 represents multi-core data processor 200 executing a single active thread, a 2T rectangular bar 520 represents multi-core data processor 200 executing two active threads, and a 4T rectangular bar 530 represents multi-core data processor 200 executing four active threads.

In operation, when the OS directs multiple threads to run concurrently on multiple CPU core modules 210, and synchronizes their behavior to produce peak activity of multi-core data processor 200, in response, the voltage droop on the power supply voltage of multi-core data processor 200 will increase in absolute value, accordingly. For example, if multi-core data processor 200 executes a single active thread, 1T rectangular bar 510 represents a voltage droop of around 0.13 volts, if multi-core data processor 200 executes two active threads, 2T rectangular bar 520 represents a voltage droop of around 0.165 volts, and if multi-core data processor 200 executes four active threads, 4T rectangular bar 520 represents a voltage droop of around 0.2 volts. Thus in this particular example, the VOLTAGE GUARDBAND OFFSET would be set equal to at least about 0.2 volts when all threads are active (which corresponds to the number of active cores).

Note that the voltage droop increases monotonically with the number of active threads, and the relationship appears to be log-linear. An integrated circuit designer can design guardband determination circuit 440 based on a full characterization and mathematical analysis of the relationship, or on simulated or measured results. For example, if guardband determination circuit 440 were implemented as a lookup table, it could contain values of active cores/threads and corresponding simulated or measured results.

Figure 6:
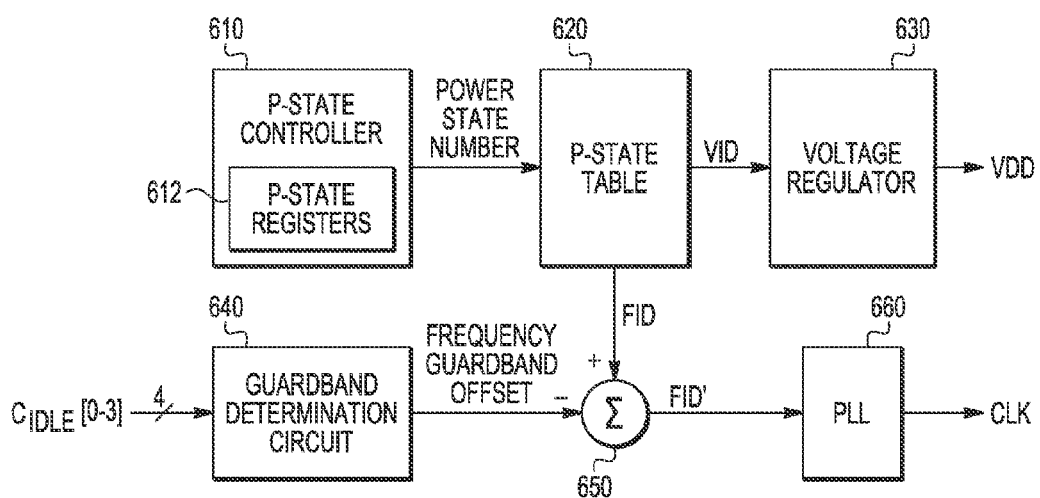
FIG. 6 illustrates in block diagram form another power controller that may be used to implement a portion of the power controller of FIG. 2 according to some embodiments.

FIG. 6 illustrates in block diagram form another power controller 600 that may be used to implement power controller 220 of FIG. 2 according to some embodiments. Power controller 600 generally includes a power state controller 610, a power state table 620, a voltage regulator 630, a guardband determination circuit 640, an adder 650, and a phase locked loop 660. Power state controller 610 includes multiple P-state registers 612.

Power state controller 610 has an output to provide signal POWER STATE NUMBER. Power state table 620 has an input to receive the POWER STATE NUMBER, an output to provide signal FID, and an output to provide signal VID. Voltage regulator 630 has an input to receive signal VID and an output to provide power supply voltage $V_{DD}$.

Guardband determination circuit 640 has an input to receive four signals $C_{IDLE}$ [0-3] from each corresponding CPU core module 210 and an output to provide a signal labeled "FREQUENCY GUARDBAND OFFSET". Adder 650 has a first input ("−") to receive signal FREQUENCY GUARDBAND OFFSET, a second input (+) to receive signal FID, and an output to provide a modified frequency identification signal labeled "FID'". Phase locked loop 660 has an input to receive signal FID' and an output to provide signal CLK.

In operation, analogous to power controller 400, power controller 600 manages CPU core modules 210 through multiple P-states. Also, the operation of power state controller 610, P-state registers 612, and power state table 620 is analogous to power state controller 410, P-state registers 412, and power state table 420, respectively.

For each operational point, power state table 620 provides signal VID to voltage regulator 630, and in response, voltage regulator 630 provides power supply $V_{DD}$ at a corresponding voltage to the active CPU core module. Also, guardband determination circuit 640 provides the FREQUENCY GUARDBAND OFFSET to adder 650 in response to a number of idle CPU core modules 210 indicated by signals $C_{IDLE}$ [0-3]. Adder 650 subtracts the value indicated by the FREQUENCY GUARDBAND OFFSET from signal FID to form a modified signal FID', and provides signal FID' at a level related to the number of active cores and inversely related to the number of signals $C_{IDLE}$ received from CPU core modules 210.

For example, if CPU core modules 212, 214, and 216 are idle (not actively running threads), power controller 600 detects a relatively low "worst case" power supply voltage droop. Guardband determination circuit 640 provides a relatively small (and possibly zero) FREQUENCY GUARDBAND OFFSET, which adder 650 subtracts from the unmodified FID to provide FID'. In response, phase locked loop 660 provides a signal CLK to an active CPU core module such as CPU core module 218 with a relatively small guardband (higher CLK signal frequency). In this way, the multi-core data processor can operate at a higher frequency. Alternatively, for example, if CPU core modules 212, 214, 216, and 218 are all active, power controller 600 detects a relatively high "worst case" power supply voltage droop. Guardband determination circuit 640 provides a relatively large FREQUENCY GUARDBAND OFFSET, which adder 650 subtracts from the unmodified FID to provide FID'. In response, phase locked loop 660 provides signal CLK to the active CPU core module with a larger guardband (lower signal CLK frequency). If more than one but fewer than all of the active CPU core modules are idle, then guardband determination circuit 400 provides a FREQUENCY GUARDBAND OFFSET of intermediate size.

By providing the CLK signal to an active one of CPU core modules 210 with a frequency guardband determined by the number of idle CPU core modules, multi-core data processor 200 reduces the possibility of failure due to voltage droop when the CPU core modules may synchronize, and increases performance when fewer CPU core modules can synchronize.

Note that the power control mechanisms described herein can be used in conjunction with other power control mechanisms. One example is a mechanism that reduces the highest available P-state to a lower P-state if the temperature of the chip is too high. Another example is to allow a CPU core to assume a "boosted" P-state if the chip is operating below its overall power limit. It should be apparent that these are just examples and other mechanisms may be used with the disclosed power control mechanism.

Figure 7:
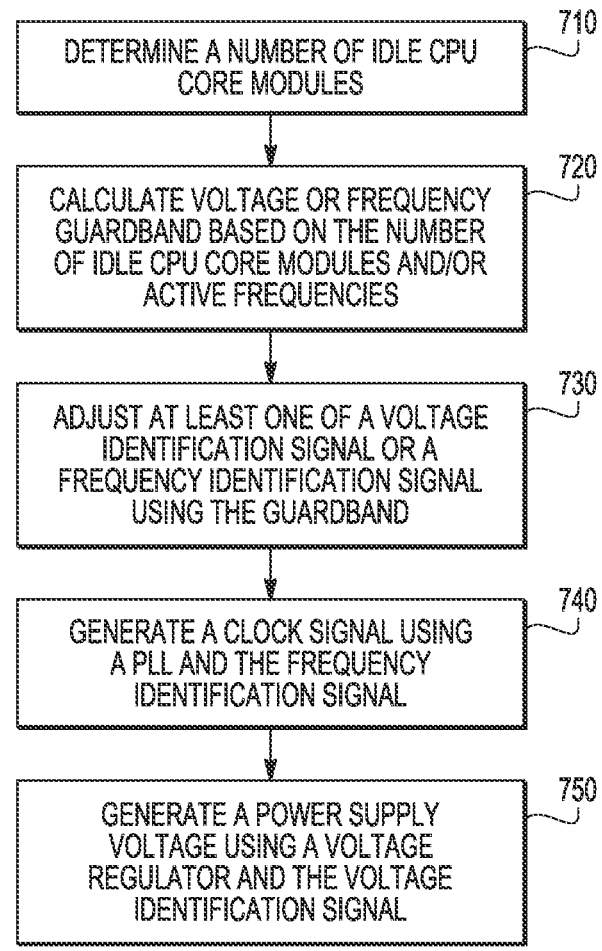
FIG. 7 illustrates a flow diagram of a method for controlling clocking and power for a multi-core data processor according to some embodiments.

FIG. 7 illustrates a flow diagram of a method 700 for controlling clocking and power for multi-core data processor 200 according to some embodiments. Action box 710 includes determining a number of idle CPU core modules. Action box 720 includes calculating a voltage or a frequency guardband based on the number of idle CPU core modules. Action box 730 includes adjusting at least one of a voltage identification signal or a frequency identification signal using the guardband. Action box 740 includes generating a clock signal using a PLL and the frequency identification signal. Action box 750 includes generating a power supply voltage using a voltage regulator and the voltage identification signal.

The functions of power controllers 400 and 600 of FIGS. 6 and 7 may be implemented with various combinations of hardware and software. For example, the P-state tables may be determined by a basic input-output system (BIOS) and stored as a table in non-volatile memory. Some of the software components may be stored in a computer readable storage medium for execution by at least one processor. Moreover the method illustrated in FIG. 7 may also be governed by instructions that are stored in a computer readable storage medium and that are executed by at least one processor. Each of the operations shown in FIG. 7 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the functions of FIGS. 2, 3, 4, and 6 may be described or represented by a computer accessible data structure in the form of a database or other data structure which can be read by a program and used, directly or indirectly, to fabricate integrated circuits with the circuits of FIGS. 2, 3, 4, and 6. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIGS. 2, 3, 4, and 6 The netlist may then be placed and routed to produce a data set describing geometric shapes to be applied to masks. The masks may then be used in various semiconductor fabrication steps to produce integrated circuits of FIGS. 2, 3, 4, and 6. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiments, multi-core data processor 200 includes four CPU core modules 210, and CPU core module 300 includes two CPU cores 310 and 320. In some embodiments, multi-core data processor 200 could include a different number of CPU core modules 210, and the CPU core modules could include a different number of CPU cores. CPU core modules 210 could be other types of data processor cores than CPU cores, such as a graphics processor unit (GPU), an advanced processing unit (APU), a digital signal processor (DSP), and the like. CPU core modules 210, respectively, could use a common circuit design or different circuit designs. Also, CPU core modules 210 and power controller 220 could be formed on a single integrated circuit or could be formed on multiple integrated circuits.

CPU core modules 210 could be integrated with phase locked loops 430 and 660, respectively, on a single semiconductor chip, or phase locked loops 430 and 660 could be on separate chips. Likewise CPU core modules 210 could be integrated with voltage regulators 460 and 630, respectively, on a single semiconductor chip, or voltage regulators 460 and 630 could be on separate chips. could be an external voltage regulator, or could be formed on a different integrated circuit external to CPU core modules 210.

In the illustrated embodiment, power controller 220 is a separate function. In some embodiments, power controller 220 could be integrated with another controller, for example, a system management unit (SMU), or it could be distributed among CPU core modules 210.

Accordingly, it is intended by the appended claims to cover all modifications of the disclosed embodiments that fall within the scope of the disclosed embodiments.

What is claimed is:

1. A multi-core data processor comprising:
    a plurality of central processing unit (CPU) core modules, each having a first input for receiving a clock signal, a second input for receiving a power supply voltage, and an output for providing an idle signal; and
    a clock and power controller coupled to each of said plurality of CPU core modules for providing said clock signal and said power supply voltage to each of said plurality of CPU core modules, said clock and power controller providing at least one of said clock signal and said power supply voltage to an active one of said plurality of CPU core modules in dependence on a number of idle signals received from said plurality of CPU core modules and upon a variable voltage guardband.

2. The multi-core data processor of claim 1 wherein each of said plurality of CPU core modules comprises:
    a first CPU core;
    a second CPU core; and
    a plurality of shared resources coupled to said first CPU core and second CPU core,
    wherein said first CPU core and said second CPU core receive a common power supply voltage.

3. The multi-core data processor of claim 1 wherein said clock and power controller provides said power supply voltage to said active one of said plurality of CPU core modules with the variable voltage guardband determined by said number of idle signals received from said plurality of CPU core modules.

4. The multi-core data processor of claim 3 wherein said clock and power controller provides said voltage guardband substantially inversely proportional to said number of idle signals received from said plurality of CPU core modules.

5. The multi-core data processor of claim 3 wherein said clock and power controller comprises:
    a phase locked loop for providing said clock signal to and active CPU core in response to a frequency identification signal;
    a guardband determination circuit coupled to each of said plurality of CPU core modules, for providing said voltage guardband offset in response to a number of idle CPU core modules;
    an adder for adding said voltage guardband offset to a voltage identification signal to form a modified voltage identification signal; and
    a voltage regulator for providing said power supply voltage to said active CPU core in response to said modified voltage identification signal.

6. The multi-core data processor of claim 5 wherein said clock and power controller further comprises:
    a power state controller for providing a power state number; and
    a power state table having an input for receiving said power state number, a first output for providing said frequency identification signal, and a second output for providing said voltage identification signal.

7. The multi-core data processor of claim 1 wherein said clock and power controller provides said clock signal to said active one of said plurality of CPU core modules with a frequency guardband determined by said number of idle signals received from said plurality of CPU core modules.

8. The multi-core data processor of claim 7 wherein said clock and power controller varies said frequency guardband substantially proportional to said number of idle signals received from said plurality of CPU core modules.

9. The multi-core data processor of claim 7 wherein said clock and power controller comprises:
a voltage regulator for providing said power supply voltage to an active CPU core in response to a voltage identification signal;
a guardband determination circuit coupled to each of said plurality of CPU core modules, for providing said frequency guardband offset in response to a number of idle CPU core modules;
an adder for subtracting said frequency guardband offset from a frequency identification signal to form a modified frequency identification signal; and
a phase locked loop for providing said clock signal to said active CPU core in response to said modified frequency identification signal.

10. The multi-core data processor of claim 9 wherein said clock and power controller further comprises:
a power state controller for providing a power state number; and
a power state table having an input for receiving said power state number, a first output for providing said frequency identification signal, and a second output for providing said voltage identification signal.

11. A multi-core data processor comprising:
a plurality of central processing unit (CPU) core modules; and
a clock and power controller coupled to each of said plurality of CPU core modules for providing a clock signal and a power supply voltage to an active one of said plurality of CPU core modules having at least one of a voltage guardband of said power supply voltage and a frequency guardband of said clock signal determined in dependence on a number of idle signals received from said plurality of CPU core modules.

12. The multi-core data processor of claim 11 wherein:
said clock and power controller further provides a respective clock signal and a respective power supply voltage to each active CPU core module of said plurality of CPU core modules.

13. The multi-core data processor of claim 11 wherein said clock and power controller provides said power supply voltage to said active one of said plurality of CPU core modules with said voltage guardband determined by said number of idle signals received from said plurality of CPU core modules.

14. The multi-core data processor of claim 13 wherein said clock and power controller provides said voltage guardband substantially inversely proportional to said number of idle signals received from said plurality of CPU core modules.

15. The multi-core data processor of claim 11 wherein said clock and power controller provides said clock signal to said active one of said plurality of CPU core modules with said frequency guardband determined by said number of idle signals received from said plurality of CPU core modules.

16. The multi-core data processor of claim 15 wherein said clock and power controller varies said frequency guardband substantially proportional to said number of idle signals received from said plurality of CPU core modules.

17. A clock and power controller for a multi-core data processor comprising:
a power state controller for providing a power state number; and
a power state table having an input for receiving said power state number, a first output for providing a frequency identification signal, and a second output for providing a voltage identification signal;
a guardband determination circuit having an input for receiving a plurality of central processing unit (CPU) core idle signals, and an output for providing a voltage guardband offset in response to a number of idle CPU core idle signals; and
an adder for adding said voltage guardband offset to said voltage identification signal to form a modified voltage identification signal.

18. The clock and power controller of claim 17 further comprising:
a phase locked loop for providing a clock signal in response to said frequency identification signal, wherein the multi-core data processor includes a plurality of CPU core modules integrated with said phase locked loop on a single integrated circuit.

19. The clock and power controller of claim 17 further comprising:
a voltage regulator for providing a power supply voltage to an active CPU core in response to said modified voltage identification signal, wherein the multi-core data processor includes a plurality of CPU core modules on a single integrated circuit, and said voltage regulator is separate from said single integrated circuit.

20. A method comprising:
determining a number of idle central processing unit (CPU) core modules of a multi-core data processor;
calculating a guardband based on said number of idle CPU core modules;
adjusting a selected one of a voltage identification signal or a frequency identification signal using said guardband;
generating a clock signal for an active CPU core module using said frequency identification signal; and
generating a power supply voltage for said active CPU core module using said voltage identification signal.

21. The method of claim 20 wherein:
said calculating said guardband comprises calculating a voltage guardband; and
said adjusting comprises adjusting said voltage identification signal using based on voltage guardband.

22. The method of claim 21 wherein:
said adjusting further comprises increasing said voltage identification signal based on said voltage guardband.

23. The method of claim 21 wherein:
said generating said power supply voltage comprises generating said power supply voltage using an external voltage regulator.

24. The method of claim 20 wherein:
said calculating said guardband comprises calculating a frequency guardband; and
said adjusting comprises adjusting said frequency identification signal based on said frequency guardband.

25. The method of claim 24 wherein:
said adjusting further comprises decreasing said frequency identification signal based on said frequency guardband.

26. The method of claim 25 wherein:
said generating said clock signal comprises generating said clock signal using an integrated phase locked loop (PLL).

* * * * *